US012595207B2

(12) United States Patent
Peters et al.

(10) Patent No.: US 12,595,207 B2
(45) Date of Patent: Apr. 7, 2026

(54) COMPOSITIONS AND METHODS OF UTILIZING RECYCLED GLASS IN BACKFILL COMPOSITIONS

(71) Applicant: J&P INVESCO LLC, Schertz, TX (US)

(72) Inventors: Stanley R. Peters, Castle Rock, CO (US); Paul A. Karam, San Antonio, TX (US); George C. Geal, III, Parker, CO (US)

(73) Assignee: J&P Invesco LLC, Schertz, TX (US)

( * ) Notice: Subject to any disclaimer, the term of this patent is extended or adjusted under 35 U.S.C. 154(b) by 364 days.

(21) Appl. No.: 18/485,940

(22) Filed: Oct. 12, 2023

(65) Prior Publication Data

US 2024/0124353 A1 Apr. 18, 2024

Related U.S. Application Data

(60) Provisional application No. 63/379,264, filed on Oct. 12, 2022.

(51) Int. Cl.
C04B 14/22 (2006.01)
C04B 16/06 (2006.01)
C04B 24/38 (2006.01)
C04B 28/04 (2006.01)

(52) U.S. Cl.
CPC .......... C04B 14/22 (2013.01); C04B 16/0633 (2013.01); C04B 24/383 (2013.01); C04B 28/04 (2013.01); C04B 2201/50 (2013.01)

(58) Field of Classification Search
CPC ... C04B 14/22; C04B 16/0633; C04B 24/383; C04B 28/04; C04B 2201/50
See application file for complete search history.

(56) References Cited

U.S. PATENT DOCUMENTS

| | | | | |
|---|---|---|---|---|
| 10,087,105 B2 * | 10/2018 | Calvin | ................. | C04B 18/027 |
| 10,239,790 B2 * | 3/2019 | Byrd | ....................... | C04B 28/04 |
| 10,836,678 B2 * | 11/2020 | Hun | ....................... | C04B 14/42 |
| 2018/0114605 A1 * | 4/2018 | Chang | .................... | C04B 28/04 |

FOREIGN PATENT DOCUMENTS

| | | | | | |
|---|---|---|---|---|---|
| DE | 3731993 A1 * | 4/1989 | ........ | C04B 20/1051 |
| WO | WO-9816483 A1 * | 4/1998 | .............. | C04B 5/06 |

OTHER PUBLICATIONS

Ahmad et al, "Concrete with Partial Substitution of Waste Glass and Recycled Concrete Aggregate", Materials 2022, 15, 430. https://doi.org/10.3390/ma15020430, https://www.mdpi.com/journal/materials (Year: 2022).*

* cited by examiner

Primary Examiner — Anthony J Green
(74) Attorney, Agent, or Firm — Merchant and Gould, P.C.

(57) ABSTRACT

Disclosed herein are compositions and methods relating to fine aggregate for a Controlled Low-Strength Material (CLSM) recycled from a consumer waste stream of bottle glass. Such disclosed compositions may be advantageous, for example, for backfilling trenches in street cuts for utility repairs or new utility installations, such as digital cables. The disclosed compositions that incorporate the recycled glass aggregate into a CLSM that achieves satisfactory compressive strengths. The disclosed compositions are not negatively impacted by Alkali-Silica Reactivity causing expansion.

26 Claims, No Drawings

1

COMPOSITIONS AND METHODS OF UTILIZING RECYCLED GLASS IN BACKFILL COMPOSITIONS

RELATED APPLICATIONS

This application claims priority to U.S. Provisional Patent Application Ser. No. 63/379,264, filed Oct. 12, 2022, which is fully incorporated herein by reference.

BACKGROUND

Demands of construction and opening roadways to traffic have accelerated in the last several years. Nationwide installation of fiber-optic data cables in streets and roadways has further spurned the development of more efficient trenching methods and high-performance backfill material. One-Pass backfilling to the pavement surface saves time of two traditional steps: backfilling to a depth beneath the pavement surface, then installing a pavement/asphalt patch material to surface. Contractors are pressured to backfill a construction trench and cover the backfill with the asphalt patch in much less time than was traditionally required. Traditional Portland cement-sand Controlled Low Strength Materials (CLSM) can take 8 to 12, even up to 24 hours before suitable for pavement repairs, and these traditional CLSMs have significant bleed water on the surface, which is problematic for applying an asphalt patch on top of the CLSM. Trench materials that are fast-setting and that have high strength gain would be useful to minimize the time to open the trenched streets back to normal traffic and to withstand the required road/traffic loads.

Additionally, compositions of CLSM often include carious aggregates. Aggregate including material that is recycled from consumer bottle glass waste streams can prove problematic in concrete compositions because of alkali-silica reactivity which causes unacceptable expansion. However, because sending beverage bottles and other glass waste to landfills fills up valuable, limited, and expensive landfill space, a composition that could successfully incorporate recycled glass material is desired.

SUMMARY

The present disclosure generally relates to the incorporation of fine aggregate made from recycled glass products, into a Controlled Low-Strength Material, CLSM), or flowable fill, for example, for backfilling trenches in street cuts for utility repairs or new utility installations, such as digital cables.

The disclosed compositions that incorporate the recycled glass aggregate into a CLSM that achieves satisfactory compressive strengths. The disclosed compositions are not negatively impacted by Alkali-Silica Reactivity causing expansion, at least partially due to the compressibility of the adjacent trench materials.

While the disclosure will be described with respect to preferred embodiment configurations and with respect to particular compositions or methods used therein, it will be understood that the disclosure is not to be construed as limited in any manner by either such configuration or components described herein. Also, while the particular types of equipment, compositions and uses are described herein, it will be understood that such particular compositions, equipment or uses are not to be construed in a limiting manner. Instead, the functionality of those compositions and methods should be appreciated. These and other variations of the disclosure will become apparent to those skilled in the art upon a more detailed description of the disclosure.

The advantages and features which characterize the disclosure are pointed out with particularity in the claims annexed hereto and forming a part hereof. For a better understanding of the disclosure, however, reference should be had to the examples, which form a part hereof and to the accompanying descriptive matter, in which there is illustrated and described embodiments of the disclosure. The provisional application to which this application claims priority is incorporated herein in its entirety.

DETAILED DESCRIPTION

The present disclosure generally relates to the incorporation of fine aggregate made from recycled glass products, into a Controlled Low-Strength Material, CLSM), or flowable fill, for example, for backfilling trenches in street cuts for utility repairs or new utility installations, such as digital cables. The disclosed compositions including the recycled glass aggregates achieve satisfactory compressive strengths. The disclosed compositions are not negatively impacted by Alkali-Silica Reactivity causing expansion, at least partially due to the compressibility of the adjacent trench materials.

Generally, one must consider several factors when determining an appropriate composition for backfilling a trench or void in the middle of a public roadway or street. These factors include the flowability or spread of the flowable fill, the setting time of the flowable fill, the final compressive strength of the flowable fill, the removability of the flowable fill, and the surface (bleed) water present on top of the composition following placement.

For example, strength development in backfilling compositions is directly related to the amount of cementitious material, aggregate, and water content. In an embodiment of this disclosure, the primary cementitious material is Portland cement. In embodiments of this disclosure, the aggregate includes at least some recycled glass aggregate (RGA) in lieu of or in combination with a traditional sand aggregate. Water content of the composition also influences strength development as the addition of water controls flowability or slump. While it is desirable to support the intended use, e.g., traffic loading, the final strength of the composition must still allow later excavation.

The present disclosure reveals a fast-setting flowable fill composition, generating higher early strengths yet still sufficiently low ultimate strengths. In an embodiment, the present disclosure achieves these goals using Portland cement and a recycled glass aggregate.

An embodiment of the disclosed technology includes a CLSM composition comprising or consisting essentially of between 60% and 95% aggregate by weight of the composition, wherein the aggregate comprises glass; between 3% and 25% Portland cement by weight of the composition; and between 5% and 40% water by weight of the composition; the composition having a compressive strength of between 15 psi and 2000 psi after 28 days.

An embodiment of the disclosed technology includes a CLSM composition comprising or consisting essentially of between 60% and 70% aggregate by weight of the composition, wherein the aggregate comprises glass; between 15% and 25% Portland cement by weight of the composition; and between 12% and 16% water by weight of the composition, the composition having a compressive strength of at least 800 psi after 7 days, and the composition having a compressive strength of at least 1000 psi after 28 days.

An embodiment of the disclosed technology includes a CLSM composition comprising or consisting essentially of between 70% and 95% aggregate by weight of the composition, wherein the aggregate comprises glass; between 3% and 5% Portland cement by weight of the composition; and between 5% and 20% water by weight of the composition, the composition having a compressive strength of at least 20 psi after 7 days, and the composition having a compressive strength of at least 50 psi after 28 days.

In an embodiment of the present disclosure, the aggregate includes a recycled glass aggregate (RGA), for example, glass from Clear Intentions, located at 5601 Downing St, Denver, CO 80216; Clean Bite, an NC Minerals Company, the latter located at 10779 Hampshire Ave S, Bloomington, MN 55438; or Sims Municipal Recycling, located at 165 Linden Ave., Jersey City, NJ 07305. The aggregate may, however, be a combination of recycled glass aggregate with one or more of the following: sand, fine aggregate (concrete sand), course aggregate (rock or gravel), recycled trench spoils, or micro aggregate (e.g., rock dust, which is commonly known as Bag House Fines (BHF).)

In embodiments of the present disclosure, the total aggregate comprises about 100% by weight RGA. In embodiments, the aggregate is substantially free of sand. In embodiments, the aggregate comprises between about 5% and between about 100% RGA, between about 10% and between about 100% RGA, between about 20% and between about 100% RGA, between about 25% and between about 30% RGA, between about 40% and between about 100% RGA, between about 50% and between about 100% RGA, between about 60% and between about 100% RGA, between about 60% and between about 70% RGA, between about 70% and between about 95% RGA, between about 70% and between about 100% RGA, between about 75% and between about 100% RGA, between about 80% and between about 100% RGA, between about 90% and between about 100% RGA, between about 95% and between about 100% RGA, between about 50% and between about 75% RGA, or between about 5% and between about 50% RGA. In embodiments, the aggregate comprises greater than about 5% of RGA, greater than about 10% of RGA, greater than about 20% of RGA, greater than about 25% of RGA, greater than about 30% of RGA, greater than about 40% of RGA, greater than about 50% of RGA, greater than about 60% of RGA, greater than about 70% of RGA, greater than about 75% of RGA, greater than about 80% of RGA, greater than about 90% of RGA, or greater than about 95% of RGA. In embodiments, the aggregate comprises less than about 5% of RGA, less than about 10% of RGA, less than about 20% of RGA, less than about 25% of RGA, less than about 30% of RGA, less than about 40% of RGA, less than about 50% of RGA, less than about 60% of RGA, less than about 70% of RGA, less than about 75% of RGA, less than about 80% of RGA, less than about 90% of RGA, less than about 95% of RGA or less than about 100% of RGA.

In examples, the RGA is available in a variety of gradations (i.e. grades of material that include a particular particle size distribution), each gradation corresponding to maximum or average particle sizes (e.g. sieve mesh sizes). In an embodiment of the present disclosure, about 100% of the particles pass through a ⅜-inch sieve mesh, between about 75% and about 100% of the particles pass through a ⅜-inch sieve mesh, between about 50% and about 100% of the particles pass through a ⅜-inch sieve mesh, between about 25% and about 75% of the particles pass through a ⅜-inch sieve mesh, between about 25% and about 50% of the particles pass through a ⅜-inch sieve mesh, between about 0% and about 50% of the particles pass through a ⅜-inch sieve mesh, or between about 0% and about 25% of the particles pass through a ⅜-inch sieve mesh. In an embodiment of the present disclosure, greater than about 75% of the particles pass through a ⅜-inch sieve mesh, greater than about 50% of the particles pass through a ⅜-inch sieve mesh, or greater than about 25% of the particles pass through a ⅜-inch sieve mesh. In an embodiment of the present disclosure, less than about 100% of the particles pass through a ⅜-inch sieve mesh, less than about 75% of the particles pass through a ⅜-inch sieve mesh, less than about 50% of the particles pass through a ⅜-inch sieve mesh, or less than about 25% of the particles pass through a ⅜-inch sieve mesh.

In an embodiment of the present disclosure, about 100% of the particles pass through a #4 sieve mesh, between about 75% and about 100% of the particles pass through a #4 sieve mesh, between about 50% and about 100% of the particles pass through a #4 sieve mesh, between about 25% and about 75% of the particles pass through a #4 sieve mesh, between about 25% and about 50% of the particles pass through a #4 sieve mesh, between about 0% and about 50% of the particles pass through a #4 sieve mesh, or between about 0% and about 25% of the particles pass through a #4 sieve mesh. In an embodiment of the present disclosure, greater than about 75% of the particles pass through a #4 sieve mesh, greater than about 50% of the particles pass through a #4 sieve mesh, or greater than about 25% of the particles pass through a #4 sieve mesh. In an embodiment of the present disclosure, less than about 100% of the particles pass through a #4 sieve mesh, less than about 75% of the particles pass through a #4 sieve mesh, less than about 50% of the particles pass through a #4 sieve mesh, or less than about 25% of the particles pass through a #4 sieve mesh.

In an embodiment of the present disclosure, about 100% of the particles pass through a #8 sieve mesh, between about 75% and about 100% of the particles pass through a #8 sieve mesh, between about 50% and about 100% of the particles pass through a #8 sieve mesh, between about 25% and about 75% of the particles pass through a #8 sieve mesh, between about 25% and about 50% of the particles pass through a #8 sieve mesh, between about 0% and about 50% of the particles pass through a #8 sieve mesh, or between about 0% and about 25% of the particles pass through a #8 sieve mesh. In an embodiment of the present disclosure, greater than about 75% of the particles pass through a #8 sieve mesh, greater than about 50% of the particles pass through a #8 sieve mesh, or greater than about 25% of the particles pass through a #8 sieve mesh. In an embodiment of the present disclosure, less than about 100% of the particles pass through a #8 sieve mesh, less than about 75% of the particles pass through a #8 sieve mesh, less than about 50% of the particles pass through a #8 sieve mesh, or less than about 25% of the particles pass through a #8 sieve mesh.

In an embodiment of the present disclosure, about 100% of the particles pass through a #16 sieve mesh, between about 75% and about 100% of the particles pass through a #16 sieve mesh, between about 50% and about 100% of the particles pass through a #16 sieve mesh, between about 25% and about 75% of the particles pass through a #16 sieve mesh, between about 25% and about 50% of the particles pass through a #16 sieve mesh, between about 0% and about 50% of the particles pass through a #16 sieve mesh, or between about 0% and about 25% of the particles pass through a #16 sieve mesh. In an embodiment of the present disclosure, greater than about 75% of the particles pass through a #16 sieve mesh, greater than about 50% of the particles pass through a #16 sieve mesh, or greater than about 25% of the particles pass through a #16 sieve mesh. In an embodiment of the present disclosure, less than about 100% of the particles pass through a #16 sieve mesh, less than about 75% of the particles pass through a #16 sieve mesh, less than about 50% of the particles pass through a #16 sieve mesh, or less than about 25% of the particles pass through a #16 sieve mesh.

In an embodiment of the present disclosure, about 100% of the particles pass through a #30 sieve mesh, between about 75% and about 100% of the particles pass through a #30 sieve mesh, between about 50% and about 100% of the particles pass through a #30 sieve mesh, between about 25% and about 75% of the particles pass through a #30 sieve mesh, between about 25% and about 50% of the particles pass through a #30 sieve mesh, between about 0% and about 50% of the particles pass through a #30 sieve mesh, or between about 0% and about 25% of the particles pass through a #30 sieve mesh. In an embodiment of the present disclosure, greater than about 75% of the particles pass through a #30 sieve mesh, greater than about 50% of the particles pass through a #30 sieve mesh, or greater than about 25% of the particles pass through a #30 sieve mesh. In an embodiment of the present disclosure, less than about 100% of the particles pass through a #30 sieve mesh, less than about 75% of the particles pass through a #30 sieve mesh, less than about 50% of the particles pass through a #30 sieve mesh, or less than about 25% of the particles pass through a #30 sieve mesh.

In an embodiment of the present disclosure, about 100% of the particles pass through a #50 sieve mesh, between about 75% and about 100% of the particles pass through a #50 sieve mesh, between about 50% and about 100% of the particles pass through a #50 sieve mesh, between about 25% and about 75% of the particles pass through a #50 sieve mesh, between about 25% and about 50% of the particles pass through a #50 sieve mesh, between about 0% and about 50% of the particles pass through a #50 sieve mesh, or between about 0% and about 25% of the particles pass through a #50 sieve mesh. In an embodiment of the present disclosure, greater than about 75% of the particles pass through a #50 sieve mesh, greater than about 50% of the particles pass through a #50 sieve mesh, or greater than about 25% of the particles pass through a #50 sieve mesh. In an embodiment of the present disclosure, less than about 100% of the particles pass through a #50 sieve mesh, less than about 75% of the particles pass through a #50 sieve mesh, less than about 50% of the particles pass through a #50 sieve mesh, or less than about 25% of the particles pass through a #50 sieve mesh.

In an embodiment of the present disclosure, about 100% of the particles pass through a #100 sieve mesh, between about 75% and about 100% of the particles pass through a #100 sieve mesh, between about 50% and about 100% of the particles pass through a #100 sieve mesh, between about 25% and about 75% of the particles pass through a #100 sieve mesh, between about 25% and about 50% of the particles pass through a #100 sieve mesh, between about 0% and about 50% of the particles pass through a #100 sieve mesh, or between about 0% and about 25% of the particles pass through a #100 sieve mesh. In an embodiment of the present disclosure, greater than about 75% of the particles pass through a #100 sieve mesh, greater than about 50% of the particles pass through a #100 sieve mesh, or greater than about 25% of the particles pass through a #100 sieve mesh. In an embodiment of the present disclosure, less than about 100% of the particles pass through a #100 sieve mesh, less than about 75% of the particles pass through a #100 sieve mesh, less than about 50% of the particles pass through a #100 sieve mesh, or less than about 25% of the particles pass through a #100 sieve mesh.

In an embodiment of the present disclosure, about 100% of the particles pass through a #200 sieve mesh, between about 75% and about 100% of the particles pass through a #200 sieve mesh, between about 50% and about 100% of the particles pass through a #200 sieve mesh, between about 25% and about 75% of the particles pass through a #200 sieve mesh, between about 25% and about 50% of the particles pass through a #200 sieve mesh, between about 0% and about 50% of the particles pass through a #200 sieve mesh, or between about 0% and about 25% of the particles pass through a #200 sieve mesh. In an embodiment of the present disclosure, greater than about 75% of the particles pass through a #200 sieve mesh, greater than about 50% of the particles pass through a #200 sieve mesh, or greater than about 25% of the particles pass through a #200 sieve mesh. In an embodiment of the present disclosure, less than about 100% of the particles pass through a #200 sieve mesh, less than about 75% of the particles pass through a #200 sieve mesh, less than about 50% of the particles pass through a #200 sieve mesh, or less than about 25% of the particles pass through a #200 sieve mesh.

In some embodiments of the present disclosure, different gradations/particle sizes of RGA may be combined together in various ratios to form a final AGR blend that will be utilized in the composition. In some examples, the ratio of gradations/particle sizes is selected so that the particle size distribution of the resulting RGA blend is analogous to a typical particle size distribution of a common sand aggregate. In some examples, three gradations of AGR are blended. In some examples, two gradations of AGR are blended. In some examples, four gradations of AGR are blended. In some examples, greater than four gradations of AGR are blended.

In a particular embodiment, an AGR blend includes about 35% by weight of a grade of which about 99% of particles pass through a #8 sieve mesh and about 49% of particles pass through a #16 sieve mesh, about 20% of a grade of which about 100% of particles pass through a #16 sieve mesh and about 50% of particles pass through a #30 sieve mesh, and about 45% of a grade of which about 100% of particles pass through a #30 sieve mesh and about 55% of particles pass through a #50 sieve mesh. In an embodiment, an AGR blend includes about 30.8% of a grade of which about 99% of particles pass through a #8 sieve mesh and about 49% of particles pass through a #16 sieve mesh, about 17.6% of a grade of which about 100% of particles pass through a #16 sieve mesh and about 50% of particles pass through a #30 sieve mesh, about 39.6% of a grade of which about 100% of particles pass through a #30 sieve mesh and about 55% of particles pass through a #50 sieve mesh, and about 12% of a grade of which about 100% of particles pass through a #50 sieve mesh and about 84% of particles pass through a #100 sieve mesh. In an embodiment, an AGR blend includes about 30.8% of a grade of which about 99% of particles pass through a #8 sieve mesh and about 49% of particles pass through a #16 sieve mesh, about 17.6% of a grade of which about 100% of particles pass through a #16 sieve mesh and about 50% of particles pass through a #30 sieve mesh, about 39.6% of a grade of which about 100% of particles pass through a #30 sieve mesh and about 55% of particles pass through a #50 sieve mesh, and about 12% of a grade of which about 100% of particles pass through a

200 sieve mesh. In an embodiment, an AGR blend includes about 45% of a grade of which about 100% of particles pass through a #8 sieve mesh and about 56% of particles pass through a #16 sieve mesh, and about 55% of a grade of which about 100% of particles pass through a #16 sieve mesh and about 73% of particles pass through a #30 sieve mesh.

In some examples, the RGA may be washed prior to inclusion in the composition, to remove dust and/or debris. Washing may be performed by any appropriate method, including rotating in a drum mixer, spraying, soaking, pouring, or other method. Washing may utilize water. Washed RGA may be rinsed and/or dried prior to mixing into the composition.

An unexpected benefit of developing a new market or beneficial use of recycled glass, is that the amount of glass that ends up in landfills may be decreased. Currently, at least 70% of consumer glass in the United States ends up in a landfill, taking up landfill space and resources. In addition to consumer glass (e.g. glass bottles, plates, and the like), various industries produce glass waste that may be utilized in the present compositions.

In an embodiment of the present disclosure, the composition has between about 50% (by weight) and about 95% FGA, between about 60% and about 95% FGA, between about 63% and about 90% FGA, between about 60% and about 90% FGA, between about 65% and about 85% FGA, between about 60% and about 70% FGA, between about 70% and about 80% FGA, or between about 85% and 85% FGA. In certain embodiments, a composition of the present disclosure will have less than about 95% FGA, less than about 90% FGA, less than about 85% FGA, less than about 80% FGA, less than about 75% FGA, less than about 70% FGA, less than about 65% FGA, or less than about 60% FGA. In still other embodiments, a composition of the present disclosure will have greater than about 55% FGA, greater than about 60% FGA, greater than about 65% FGA, greater than about 70% FGA, greater than about 75% FGA, greater than about 80% FGA, greater than about 85% FGA or greater than about 90% FGA.

In an embodiment of the present disclosure, the cementitious material is standard Portland cement, which is well known in the industry. The Portland cement of the present disclosure may be Type I, Type II, Type III, Type IV, Type V, or some combination thereof. In an embodiment, the Portland cement is Type I-II. The Portland cement of the present disclosure can be obtained from a variety of sources based on economics, location, chemical properties, or additional criteria. For example, Portland cement can be obtained from CEMEX, New Braunfels Balcones Cement Plant, 2580 Wald Rd., New Braunfels, TX 78132; or from CEMEX, 5134 Ute Rd, Longmont, Colorado 80503.

In an embodiment of the present disclosure, a composition has between about 3% and about 25% Portland cement, between about 4% and about 20% Portland cement, between about 8% and about 17% Portland cement, between about 3% and about 5% Portland cement, between about 3% and about 6% Portland cement, between about 4% and about 10% Portland cement, between about 17% and about 23% Portland cement, or between about 15% and about 25% Portland cement. In some embodiments of the present disclosure, a composition has a measurable amount of, but less than about 40% Portland cement, less than about 35% Portland cement, less than about 30% Portland cement, less than about 25% Portland cement, less than about 20% Portland cement, less than about 15% Portland cement, less than about 10% Portland cement, or less than about 5%

Portland cement. In additional embodiments of the present disclosure, the composition has greater than about 3% Portland cement, greater than about 4% Portland cement, greater than about 5% Portland cement, greater than about 10% Portland cement, greater than about 15% Portland cement, greater than about 17% Portland cement, greater than about 20% Portland cement, greater than about 25% Portland cement, greater than about 30% Portland cement, or a greater than about 35% Portland cement.

In an embodiment of the presently disclosed composition, the water is standard city potable water. In another embodiment, the water used in the composition is substantially purified of additional minerals or other impurities. In still another embodiment of the present disclosure, the water is non-potable water. In additional embodiments, the water is selected based on its natural impurities, e.g., specific mineral content like calcium, magnesium, iron, or similar water minerals.

The water content of the presently disclosed composition may vary depending on desired flowability, setting time, and final compressive strength. In an embodiment of the present disclosure, a composition has a water content of between about 5% and about 40%, between about 5% and about 20%, between about 12% and about 20%, between about 4% and about 8%, between about 15% and about 20%, between about 10% and about 20%, between about 13% and about 16%, or between about 12% and about 16%. In additional embodiments, a composition has greater than about 5% water, greater than about 6% water, greater than about 10% water, greater than about 15% water, greater than about 20% water, or greater than about 25% water. In other embodiments, a composition has less than about 40% water, less than about 35% water, less than about 30% water, less than about 25% water, less than about 20% water, less than about 16% water, less than about 15% water, or less than about 10% water. Any water included with additional ingredients, e.g., aqueous water retarders, foaming agents, etc. under the circumstances encountered in the field by the inventors has been negligible in comparison to the primary batch water and therefore has not been included in the above calculations. Depending on the actual water content of the additional ingredients used it may be necessary to consider the additional water in the final water concentrations.

Compositions of the present disclosure will have a range of possible set times based on the desired application. For example, when backfilling trenches in a roadway a quick set time is desired providing the set time allows sufficient time to complete filling of the void with the composition. Despite the desire for a quick set time, the ultimate final compressive strength must not exceed the local agency standards, i.e., maintain good removability modulus numbers.

Compositions of the present disclosure will have a range of compressive strengths at various times after the addition of a composition to a trench depending on the desired properties of the composition. For example, and similar to faster set times, a higher earlier compressive strength is advantageous when working when backfilling trenches in a roadway or other highly traveled area. The higher, earlier compressive strength allows for the backfilled void to be patched and reopened for use at an earlier time. Again, despite the desire for a high earlier compressive strength the final compressive strength must not exceed the local agency standards, i.e., maintain good removability modulus numbers.

In certain embodiments, the compressive strength is measured at 1 day, 3 days, 7 days, and/or 28 days, where the 28-day measurement is considered the final compressive strength. In other embodiments, the compressive strength is measured more often at smaller intervals. In some embodiments, the compressive strength is measured at 90 days.

In some examples, for some compositions (for examples, for some micro-trenching fill compositions), the compressive strength of a composition may be defined as adequate if it achieves at least about 1000 psi at 28 days. In some examples, for some compositions (for example, for some flowable fill compositions), the compressive strength of a composition may be defined as adequate if it achieves at least about 50 psi at 28 days. In some examples, for some compositions (for examples, for some flowable fill compositions), the compressive strength of a composition may be defined as adequate if it achieves at least about 150 psi at 28 days. In some examples, for some compositions (for examples, for some flowable fill compositions), the compressive strength of a composition may be defined as adequate if it achieves at least about 300 psi at 28 days. In some examples, for some compositions (for examples, for some flowable fill compositions), the compressive strength of a composition may be defined as adequate if it achieves at least between about 50 psi and about 300 psi at 28 days. In some examples, for some compositions (for examples, for some flowable fill compositions), the compressive strength of a composition may be defined as adequate if it achieves at least between about 50 psi and about 150 psi at 28 days.

In an embodiment, the compressive strength of a composition of the present disclosure at 28 days will be between about 50 psi and about 2000 psi, between about 50 psi and about 1500 psi, between about 100 psi and about 2000 psi, between about 125 psi and about 300 psi, between about 50 psi and about 100 psi, between about 100 psi and about 200 psi, between about 100 psi and about 180 psi, between about 1000 psi and about 2000 psi, between about 1500 psi and about 2000 psi, or between about 1000 psi and about 1200 psi. In additional embodiments, the compressive strength of the composition at 28 days will be greater than about 50 psi, greater than about 60 psi, greater than about 75 psi, will be greater than about 100 psi, will be greater than about 125 psi, will be greater than about 150 psi, will be greater than about 175 psi, will be greater than about 200 psi, greater than about 250 psi, greater than about 1000 psi, greater than about 1100 psi, greater than about 1200 psi, greater than about 1300 psi, greater than about 1500 psi, or greater than about 1800 psi. In certain embodiments, the compressive strength of the composition at 28 days will be less than about 2000 psi, less than about 1500 psi, less than about 1000 psi, less than about 500 psi, less than about 200 psi, less than about 150 psi, or less than about 100 psi.

In an embodiment, the compressive strength of a composition of the present disclosure at 7 days will be between about 20 psi and about 2000 psi, between about 50 psi and about 1500 psi, between about 100 psi and about 2000 psi, between about 50 psi and about 200 psi, between about 20 psi and about 80 psi, between about 800 psi and about 2000 psi, between about 90 psi and about 130 psi, between about 800 psi and about 1000 psi, between about 1300 psi and about 2000 psi, or between about 800 psi and about 1500 psi. In additional embodiments, the compressive strength of the composition at 7 days will be greater than about 20 psi, greater than about 50 psi, greater than about 60 psi, greater than about 75 psi, will be greater than about 100 psi, will be greater than about 125 psi, will be greater than about 150 psi, will be greater than about 175 psi, will be greater than about 200 psi, greater than about 500 psi, greater than about 750 psi, greater than about 800 psi, greater than about 900 psi, greater than about 1000 psi, greater than about 1100 psi, greater than about 1200 psi, greater than about 1300 psi, greater than about 1500 psi, or greater than about 1800 psi. In certain embodiments, the compressive strength of the composition at 7 days will be less than about 2000 psi, less than about 1500 psi, less than about 1000 psi, less than about 500 psi, less than about 200 psi, less than about 150 psi, less than about 100 psi, or less than about 75 psi.

Similar to compressive strength, compositions of the present disclosure will have a range of penetration resistances at various times after the addition of a composition to a trench depending on the desired properties of the composition. For example, and similar to faster set times, a higher earlier penetration resistance is advantageous when working when backfilling trenches in a roadway or other highly traveled area. The higher, earlier penetration resistance allows for the backfilled void to be patched and reopened for use at an earlier time. Again, despite the desire for a high earlier penetration resistance the final compressive strength must not exceed the local agency standards, i.e., maintain good removability modulus numbers.

In some embodiments, the disclosed compositions include a coloring agent. A coloring agent is often added to concrete mixtures, for example, to match a surrounding concrete or asphalt, or for other aesthetic reasons. The coloring agent in certain compositions may be black to match the color of asphalt.

In some embodiments, a composition has a percent (by weight) of coloring agent of between about 0.50% and about 2.00%, between about 1.00% and about 1.50%, or between about 1.10% and about 1.20%. In some embodiments, a composition has a percent (by weight) of coloring agent of greater than about 0.50%, greater than about 1.00%, greater than about 1.10%, or greater than about 1.50%. In some embodiments, a composition has a percent (by weight) of coloring agent of less than about 1.00%, less than about 1.20%, less than about 1.50%, or less than about 2.00%.

In some embodiments, the disclosed compositions include a polymer such as hydroxypropyl methyl cellulose ether (HPMC). HPMC may improve the workability and performance of the compositions in several ways. HPMC may function as a set retarder, which helps to increase workability and pumpability for workers placing the composition. As a water water-retainer, HPMC can minimize surface/edge cracks and improve adhesion. In some examples, HPMC can improve the viscosity, reduce shrinkage, and/or increase strength. In some examples, the addition of HPMC captures air within the composition, which has beneficial properties for reducing freeze thaw heave. The addition of HPMC alone or in combination with other polymers helps achieve greater air entrainment of a composition; and help improve suspension of aggregate particles (for example, FGA) in the mix. These properties may result in a more fluid, non-segregating, minimal bleed water mix, while using less water.

In some embodiments, a composition has a composition has a percent (by weight) of HPMC of between about 0.02% and 0.07%, between about 0.05% and 0.07%, or between about 0.05% and 0.06%. In some embodiments, a composition has a composition has a percent (by weight) of HPMC of greater than about 0.02%, greater than about 0.04%, or greater than about 0.05%. In some embodiments, a composition has a composition has a percent (by weight) of HPMC of less than about 0.10%, less than about 0.08%, or less than about 0.07%.

In some embodiments, the disclosed compositions include fibers. The fibers in certain compositions may be made from polypropylene and may in certain embodiments vary in length (between or either 0.5 inches or 0.25 inches in length). The inclusion of fibers in the composition may increase strength (including early strength), improve cohesion, increase impact resistance, improve freeze-thaw resistance, and reduce cracking.

In some embodiments, a composition has a percent (by weight) of fibers of between about 0.05% and 0.10% or between about 0.06% and 0.08%. In some embodiments, a composition has a percent (by weight) of fibers of greater than about 0.05%, or greater than about 0.06%. In some embodiments, a composition has a percent (by weight) of fibers of less than about 0.10%, or less than about 0.08%.

The present disclosure also provides for a method of backfilling a trench with a disclosed composition. In one embodiment, a method of backfilling a trench with a composition comprising recycled glass aggregate in lieu of or in combination with sand aggregate. For example, a method includes excavating a trench or void, maintaining some portion of the excavated trench spoils for addition to a composition, mixing a composition of the present disclosure that includes some portion of the recycled glass aggregate, and filing the trench or void with the composition that includes the recycled glass aggregate.

EXAMPLES

Example 1

Six embodiments of the CLSM compositions described above were prepared for testing and evaluation. The components for each of the six compositions is set forth below based on pounds per cubic yard (lb/cy) and percent (%) of the composition by weight. The cement in each composition is Portland cement, CEMEX Type I, available from New Braunfels Balcones Cement Plant, 2580 Wald Rd., New Braunfels, TX 78132. The water for each composition is standard tap water. The standard sand aggregate for G-600-FP and G-800-FP compositions is from Austin Aggregates, located at River Sand, C33, 881 Hergotz Ln, Austin, TX. The hydroxypropyl methyl cellulose ether (HPMC), if any, is ReCell H400, available from Bio-Polymer industries, located at 2001 N 170th East Ave., Tulsa, OK 74116. The color, if any, is TruTique Integral Color Pigment (Gun Metal), Iron Oxide, from Sure Crete LLC, 15246 Citrus County Drive, Dade City, FL 3523. The fibers, if any, are Fibercast polypropylene fibers from Sika, located at 201 Polito Ave., Lyndhurst New Jersey 07071. Mix ID's are consistent throughout the Examples and descriptions of the cement, water, sand, color, HPMC, and fibers are consistent throughout the Examples unless otherwise noted.

Instead of sand, compositions G-600-FPG, G-600-FPG12, G-600-FPG-200, and G-800-FPG include recycled glass aggregate (RGA). The RGA for Example 1 was sourced from Clear Intentions, located at 5601 Downing St, Denver, CO 80216. The Clear Intentions (CI) RGA was received in multiple gradations of mesh sizes. Table 1A shows a percent of each gradation that passes through specified sieve mesh sizes.

TABLE 1A

Clear Intentions percent passing for each glass gradation.

| | % passing for product grade | | | |
| Sieve | 12/20 | 20/40 | 40/70 | −70 |
|---|---|---|---|---|
| ⅜" | 100 | 100 | 100 | 100 |
| #4 | 100 | 100 | 100 | 100 |
| #8 | 99 | 100 | 100 | 100 |
| #16 | 49 | 100 | 100 | 100 |
| #30 | 11 | 50 | 100 | 100 |
| #50 | 1 | 0 | 55 | 100 |
| #100 | 1 | 0 | 9 | 84 |
| #200 | 0.3 | 0.1 | 1.8 | 43.3 |

The different gradations were utilized to create mixed RGA blends that would generate a gradation similar to a standard sand aggregate. A first blend of CI RGA that included 35% 12/20, 20% 20/40, and 45% 40/70 gradations was selected. Table 1B shows a comparison of the percent of the first selected CI RGA Blend that passes through specified sieve mesh sizes and the standard concrete sand.

TABLE 1B

Comparison of percent passing of a selected
CI RGA Blend to percent passing of sand.

| | Concrete | CI Recycled |
| Sieve | Sand | Glass Blend |
|---|---|---|
| ⅜" | 100 | 100 |
| #4 | 99 | 100 |
| #8 | 93 | 100 |
| #16 | 78 | 82 |
| #30 | 49 | 59 |
| #50 | 18 | 25 |
| #100 | 3 | 4 |
| #200 | 0.6 | 1 |

A second CI RGA Blend was also selected for testing, that included the first selected CI RGA Blend with an additional 12% of the −70 gradation included. A third CI RGA Blend was also selected for testing, that included the first selected CI RGA Blend with an additional 12% of a −200 gradation included. The −200 gradation RGA was obtained by screening the −70 CI RGA gradation through a #200 sieve mesh (i.e. 100% passed through the #200 sieve mesh).

Table 1C below includes compositions of two baseline compositions that include sand aggregate (G-600-FP and G-800-FP) and four compositions that include RGA in lieu of sand. G-600-FPG and G-800-FPG include the first selected CI RGA Blend. G-600-FPG12 includes the second selected CI RGA Blend. G-600-FPG-200 includes the third selected IC RGA Blend. The compositions are provided in pounds per cubic yard (lb/CY) and percent (%) by weight of the wet composition.

TABLE 1C

Six compositions of Example 1, including Clear Intentions RGA Blends.

| Mix ID | Composition (lb/CY) | | | | | | | Composition (% by Weight) | | | | | | |
|---|---|---|---|---|---|---|---|---|---|---|---|---|---|---|
| | Cement | Sand | RGA | Color | HPMC | Fibers | Water | Cement | Sand | RGA | Color | HPMC | Fibers | Water |
| G-600-FP | 600 | 2450 | 0 | 20 | 2 | 2.5 | 559 | 16.51% | 80.76% | 0.00% | 0.55% | 0.06% | 0.07% | 15.38% |
| G-600-FPG | 600 | 0 | 2350 | 40 | 2 | 2.5 | 534 | 17.00% | 0.00% | 66.60% | 1.13% | 0.06% | 0.07% | 15.13% |
| G-600-FPG12 | 600 | 0 | 2350 | 40 | 2 | 2.5 | 534 | 17.00% | 0.00% | 66.60% | 1.13% | 0.06% | 0.07% | 15.13% |
| G-600-FPG-200 | 600 | 0 | 2350 | 40 | 2 | 2.5 | 545 | 16.95% | 0.00% | 66.39% | 1.13% | 0.06% | 0.07% | 15.40% |
| G-800-FP | 800 | 2400 | 0 | 20 | 2 | 2.5 | 510 | 21.42% | 81.78% | 0.00% | 0.54% | 0.05% | 0.07% | 13.66% |
| G-800-FPG | 800 | 0 | 2220 | 40 | 2 | 2.5 | 526 | 22.28% | 0.00% | 61.83% | 1.11% | 0.06% | 0.07% | 14.65% |

For each of the six compositions, 3-inch diameter by 6-inch long test cylinders were formed, and compressive strengths were measured (using the American Society for Testing Materials ASTM C39/C39M Standard Test Method for Compressive Strength of Cylindrical Concrete Specimens) at 1 day, 7 days, and 28 days. Table 1D below includes compressive strengths of the six compositions shown in Table 1C. The compressive strengths are provided in pounds per square inch (psi). As shown in Table 1D, the G-600-FPG, G-600-FPG12, G-600-FPG-200, and G-800-FPG compositions all achieve adequate compression strengths at 28 days (e.g. compressive strengths at least about 1000 psi).

TABLE 1D

Compression Strengths of the six compositions of Example 1.

| Mix ID | Compressive Strength (psi) | | | | Notes |
|---|---|---|---|---|---|
| | 1-day | 3-day | 7-day | 28-day | |
| G-600-FP | 200 | — | 850 | 1370 | Baseline |
| G-600-FPG | 360 | — | 830 | 1050 | CI Blend |
| G-600-FPG12 | 470 | — | 950 | 1170 | CI blend w/+12% −70 glass fines |
| G-600-FPG-200 | 450 | — | 820 | 1110 | CI Blend w/+12% −200 glass fines |
| G-800-FP | 820 | — | 1970 | 2750 | Baseline |
| G-800-FPG | 980 | — | 1450 | 1930 | CI Blend |

Example 2

Two embodiments of the CLSM compositions described above were prepared for testing and evaluation. The components for each of the two compositions is set forth below based on pounds per cubic yard (lb/cy) and percent (%) of the composition by weight. The cement, water, sand, HPMC, color, and fibers, if any, are sourced as described above with respect to Example 1. Mix ID's are consistent throughout the Examples and descriptions of the cement, water, sand, color, HPMC, and fibers are consistent throughout the Examples unless otherwise noted.

Instead of sand, composition CBA-150 includes RGA. The RGA for Example 2 was sourced from Clean Bite, an NC Minerals Company, the latter located at 10779 Hampshire Ave S, Bloomington, MN 55438. The Clean Bite (CB) RGA was received in multiple gradations (coarse, medium, fine). Table 2A shows a percent of each gradation that passes through specified sieve mesh sizes.

TABLE 2A

Clean Bite percent passing for each glass gradation.

| Sieve | % passing for product grade Coarse | Medium | Fine |
|---|---|---|---|
| 3/8" | 100 | 100 | 100 |
| #4 | 100 | 100 | 100 |
| #8 | 100 | 100 | 100 |
| #16 | 56 | 100 | 100 |
| #30 | 0 | 73 | 100 |
| #50 | 0 | 32 | 100 |
| #100 | 0 | 6 | 96 |
| #200 | 0 | 1 | 46.2 |

The different gradations were utilized to create mixed RGA blends that would generate a gradation similar to a standard sand aggregate. A blend of CB RGA that included 45% Coarse gradation and 55% Medium gradation was selected. Table 2B shows a comparison of the percent of the selected CB RGA Blend that passes through specified sieve mesh sizes and the standard concrete sand.

TABLE 2B

Comparison of percent passing of a selected CB RGA Blend to percent passing of sand.

| Sieve | Concrete Sand | CB Recycled Glass Blend |
|---|---|---|
| 3/8" | 100 | 100 |
| #4 | 99 | 100 |
| #8 | 93 | 100 |
| #16 | 78 | 80 |
| #30 | 49 | 40 |
| #50 | 18 | 18 |
| #100 | 3 | 3 |
| #200 | 0.6 | 1 |

Table 2C below includes compositions of one baseline composition that includes sand aggregate (S-150) and one composition that includes RGA in lieu of sand. CBA-150 includes the selected BC RGA Blend. The BC RGA Blend was washed prior to inclusion in the composition, to remove non-glass debris and residue. Washing was done by rotating the RGA in a drum mixer with water, draining the drum, and rinsing the RGA. The washing, draining, and mixing steps were performed at least three times. The washed RGA was then oven dried. The compositions are provided in pounds per cubic yard (lb/CY) and percent (%) by weight of the wet composition.

TABLE 2C

| | Composition (lb/CY) | | | | | | Composition (% by Weight) | | | | | | |
|---|---|---|---|---|---|---|---|---|---|---|---|---|---|
| Mix ID | Cement | Sand | RGA | Color | HPMC | Fibers | Water | Cement | Sand | RGA | Color | HPMC | Fibers | Water |
| S-150 | 150 | 2775 | 0 | 0 | 0 | 0 | 526 | 4.35% | 84.06% | 0.00% | 0.00% | 0.00% | 0.00% | 15.24% |
| CBA-150 | 150 | 0 | 2600 | 0 | 0 | 0 | 596 | 4.48% | 0.00% | 77.70% | 0.00% | 0.00% | 0.00% | 17.81% |

Two compositions of Example 2, including Clean Bite RGA Blends.

For each of the two compositions, 3-inch diameter by 6-inch long test cylinders were formed, and compressive strengths were measured (using the American Society for Testing Materials ASTM C39/C39M Standard Test Method for Compressive Strength of Cylindrical Concrete Specimens) at 1 day, 7 days, and 28 days. Table 2D below includes compressive strengths of the two compositions shown in Table 2C. The compressive strengths are provided in pounds per square inch (psi). As shown in Table 2D, the CBA-150 achieves adequate compression strength at 28 days (e.g. compressive strength at least about 50 psi to at least about 300 psi).

TABLE 2D

Compression Strengths of the two compositions of Example 2.

| | Compressive Strength (psi) | | | | |
|---|---|---|---|---|---|
| Mix ID | 1-day | 3-day | 7-day | 28-day | Notes |
| S-150 | 10 | — | 70 | 110 | Baseline |
| CBA-150 | — | 10 | 28 | 62 | CB Blend - Washed |

Example 3

Three embodiments of the CLSM compositions described above were prepared for testing and evaluation. The components for each of the two compositions is set forth below based on pounds per cubic yard (lb/cy) and percent (%) of the composition by weight. The cement, water, sand, HPMC, color, and fibers, if any, are sourced as described above with respect to Example 1. Mix ID's are consistent throughout the Examples and descriptions of the cement, water, sand, color, HPMC, and fibers are consistent throughout the Examples unless otherwise noted.

Instead of sand, compositions NJG-150 and NJG-150-W includes RGA. The RGA for Example 2 was sourced from Sims Municipal Recycling, located at 165 Linden Ave., Jersey City, NJ 07305. The New Jersey (NJ) RGA was received in a single gradation. Table 3A shows a percent of the gradation that passes through specified sieve mesh sizes.

TABLE 3A

New Jersey percent passing for each glass gradation.

| Sieve | NJ RGA |
|---|---|
| 3/4" | 100 |
| 1/2" | 99 |
| 3/8" | 98 |
| #4 | 52 |
| #8 | 22 |
| #16 | 10 |
| #30 | 4 |
| #50 | 1 |
| #100 | 0 |
| #200 | 0.1 |

Table 3B below includes compositions of one baseline composition that includes sand aggregate (S-150) and two compositions that include RGA in lieu of sand. NJG-150 includes unwashed NG RGA. NJG-150-W includes washed NG RGA, where the NG RGA was washed prior to inclusion in the composition to remove non-glass debris and residue. Washing was performed as described above in Example 2. The compositions are provided in pounds per cubic yard (lb/CY) and percent (%) by weight of the wet composition.

TABLE 3B

| Mix ID | Composition (lb/CY) | | | | | | | Composition (% by Weight) | | | | | | |
|---|---|---|---|---|---|---|---|---|---|---|---|---|---|---|
| | Cement | Sand | RGA | Color | HPMC | Fibers | Water | Cement | Sand | RGA | Color | HPMC | Fibers | Water |
| S-150 | 150 | 2775 | 0 | 0 | 0 | 0 | 526 | 4.35% | 84.06% | 0.00% | 0.00% | 0.00% | 0.00% | 15.24% |
| NJG-150 | 150 | 0 | 3478 | 0 | 0 | 0 | 246 | 3.87% | 0.00% | 89.78% | 0.00% | 0.00% | 0.00% | 6.35% |
| NJG-150-W | 150 | 0 | 3500 | 0 | 0 | 0 | 237 | 3.86% | 0.00% | 90.04% | 0.00% | 0.00% | 0.00% | 6.10% |

Three compositions of Example 3, including New Jersey NGA.

For each of the three compositions, 3-inch diameter by 6-inch long test cylinders were formed, and compressive strengths were measured (using the American Society for Testing Materials ASTM C39/C39M Standard Test Method for Compressive Strength of Cylindrical Concrete Specimens) at 1 day, 7 days, and 28 days. Table 3C below includes compressive strengths of the three compositions shown in Table 3B. The compressive strengths are provided in pounds per square inch (psi). As shown in Table 3C, the NJG-150 and NJG-150-W both achieve adequate compression strengths at 28 days (e.g. compressive strengths at least about 50 psi to at least about 300 psi).

TABLE 3C

Compression Strengths of the three compositions of Example 3.

| Mix ID | Compressive Strength (psi) | | | | |
| | 1-day | 3-day | 7-day | 28-day | Notes |
| --- | --- | --- | --- | --- | --- |
| S-150 | 10 | — | 70 | 110 | Baseline |
| NJG-150 | — | 80 | 100 | 120 | NJ Glass - Unwashed |
| NJG-150-W | — | 110 | 115 | 160 | NJ Glass - Washed |

While particular uses of the technology have been illustrated and discussed above, the disclosed technology can be used with a variety of environments in accordance with many examples of the technology. The above discussion is not meant to suggest that the disclosed technology is only suitable for implementation within the environments shown and described above. As should be appreciated, the various aspects described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or operations are disclosed only as illustrative aspects. The scope of the technology is defined by the following claims and any equivalents therein. Therefore, the specific structure, acts, or operations are disclosed only as illustrative aspects. The scope of the technology is defined by the following claims and any equivalents therein. Examples of the disclosure may be described according to the following aspects.

Aspect 1. A composition for a controlled low-strength materials concrete comprising: between 60% and 95% aggregate by weight of the composition, wherein the aggregate comprises glass; between 3% and 25% Portland cement by weight of the composition; and between 5% and 40% water by weight of the composition, the composition having a compressive strength of between 20 psi and 2000 psi after 7 days, and the composition having a compressive strength between 15 psi and 2000 psi after 28 days.

Aspect 2. The composition of aspect 1, wherein the aggregate is between 60% and 70% by weight.

Aspect 3. The composition of aspect 1, wherein the aggregate is substantially free of sand.

Aspect 4. The composition of aspect 1, wherein the glass is recycled glass.

Aspect 5. The composition of aspect 1, wherein the aggregate comprises greater than 5% by weight of the glass.

Aspect 6. The composition of aspect 1, wherein the glass has a particle distribution wherein greater than about 50% of the particles pass through a #16 sieve mesh.

Aspect 7. The composition of aspect 1, wherein the glass comprises a blend of at least two grades of glass, each grade of glass having a corresponding particle size distribution.

Aspect 8. The composition of aspect 7, wherein the blend comprises: about 45% by weight of a first grade of glass, wherein the first grade has a first particle distribution wherein about 56% of particles pass through a #16 sieve mesh; and about 55% by weight of a second grade of glass, wherein the second grade has a second particle distribution wherein about 73% of particles pass through a #30 sieve mesh.

Aspect 9. The composition of aspect 7, wherein the glass comprises a blend of three grades of glass, each grade of glass having a corresponding particle size distribution.

Aspect 10. The composition of aspect 9, wherein the blend comprises: about 35% by weight of a first grade of glass, wherein the first grade has a first particle distribution wherein about 49% of particles pass through a #16 sieve mesh; about 20% by weight of a second grade of glass, wherein the second grade has a second particle distribution wherein about 50% of particles pass through a #30 sieve mesh; and about 45% by weight of a third grade of glass, wherein the third grade has a third particle distribution wherein about 55% of particles pass through a #50 sieve mesh.

Aspect 11. The composition of aspect 1, wherein the Portland cement is between 15% and 25% by weight.

Aspect 12. The composition of aspect 1, wherein the Portland cement is between 3% and 6% by weight.

Aspect 13. The composition of aspect 1, wherein the water is between 10% and 20% by weight.

Aspect 14. The composition of aspect 1, wherein the composition has a compressive strength of between 100 psi and 200 psi after 28 days.

Aspect 15. The composition of aspect 1, wherein the composition has a compressive strength of between 50 psi and 100 psi after 28 days.

Aspect 16. The composition of aspect 1, wherein the composition has a compressive strength of between 1000 psi and 2000 psi after 28 days.

Aspect 17. The composition of aspect 1 further comprising fibers.

Aspect 18. The composition of aspect 17 wherein the fibers are between 0.05% and 0.10% by weight in the composition.

Aspect 19. The composition of aspect 17 wherein the fibers are polypropylene fibers.

Aspect 20. The composition of aspect 1 further comprising a polymer.

Aspect 21. The composition of aspect 20, wherein the polymer is between 0.02% and 0.07% by weight in the composition.

Aspect 22. The composition of aspect 20, wherein the polymer is hydroxypropyl methylcellulose.

Aspect 23. The composition of aspect 1, further comprising: between 60% and 70% aggregate by weight of the composition, wherein the aggregate comprises glass;

between 15% and 25% Portland cement by weight of the composition; and between 12% and 16% water by weight of the composition, the composition having a compressive strength of at least 800 psi after 7 days, and the composition having a compressive strength of at least 1000 psi after 28 days.

Aspect 24. The composition of aspect 1, further comprising: between 70% and 95% aggregate by weight of the composition, wherein the aggregate comprises glass; between 3% and 5% Portland cement by weight of the composition; and between 5% and 20% water by weight of the composition, the composition having a compressive strength of at least 20 psi after 7 days, and the composition having a compressive strength of at least 50 psi after 28 days.

Aspect 25. The composition of aspect 24, wherein the composition has a compressive strength of between 50 psi and 300 psi after 28 days.

Aspect 26. The composition of aspect 25, wherein the composition has a compressive strength of between 50 psi and 150 psi after 28 days.

What is claimed is:

1. A composition for a controlled low-strength materials concrete comprising:
   between 60% and 95% aggregate by weight of the composition, wherein the aggregate comprises glass;
   between 3% and 25% Portland cement by weight of the composition; and
   between 5% and 40% water by weight of the composition;
   the composition having a compressive strength of between 20 psi and 2000 psi after 7 days, and the composition having a compressive strength between 15 psi and 2000 psi after 28 days.

2. The composition of claim 1, wherein the aggregate is between 60% and 70% by weight.

3. The composition of claim 1, wherein the aggregate is substantially free of sand.

4. The composition of claim 1, wherein the glass is recycled glass.

5. The composition of claim 1, wherein the aggregate comprises greater than 5% by weight of the glass.

6. The composition of claim 1, wherein the glass has a particle distribution wherein greater than about 50% of the particles pass through a #16 sieve mesh.

7. The composition of claim 1, wherein the glass comprises a blend of at least two grades of glass, each grade of glass having a corresponding particle size distribution.

8. The composition of claim 7, wherein the blend comprises:
   about 45% by weight of a first grade of glass, wherein the first grade has a first particle distribution wherein about 56% of particles pass through a #16 sieve mesh; and
   about 55% by weight of a second grade of glass, wherein the second grade has a second particle distribution wherein about 73% of particles pass through a #30 sieve mesh.

9. The composition of claim 7, wherein the glass comprises a blend of three grades of glass, each grade of glass having a corresponding particle size distribution.

10. The composition of claim 9, wherein the blend comprises:
    about 35% by weight of a first grade of glass, wherein the first grade has a first particle distribution wherein about 49% of particles pass through a #16 sieve mesh;
    about 20% by weight of a second grade of glass, wherein the second grade has a second particle distribution wherein about 50% of particles pass through a #30 sieve mesh; and
    about 45% by weight of a third grade of glass, wherein the third grade has a third particle distribution wherein about 55% of particles pass through a #50 sieve mesh.

11. The composition of claim 1, wherein the Portland cement is between 15% and 25% by weight.

12. The composition of claim 1, wherein the Portland cement is between 3% and 6% by weight.

13. The composition of claim 1, wherein the water is between 10% and 20% by weight.

14. The composition of claim 1, wherein the composition has a compressive strength of between 100 psi and 200 psi after 28 days.

15. The composition of claim 1, wherein the composition has a compressive strength of between 50 psi and 100 psi after 28 days.

16. The composition of claim 1, wherein the composition has a compressive strength of between 1000 psi and 2000 psi after 28 days.

17. The composition of claim 1 further comprising fibers.

18. The composition of claim 17 wherein the fibers are between 0.05% and 0.10% by weight in the composition.

19. The composition of claim 17 wherein the fibers are polypropylene fibers.

20. The composition of claim 1 further comprising a polymer.

21. The composition of claim 20, wherein the polymer is between 0.02% and 0.07% by weight in the composition.

22. The composition of claim 20, wherein the polymer is hydroxypropyl methylcellulose.

23. The composition of claim 1, comprising:
    between 60% and 70% aggregate by weight of the composition, wherein the aggregate comprises glass;
    between 15% and 25% Portland cement by weight of the composition; and
    between 12% and 16% water by weight of the composition;
    the composition having a compressive strength of at least 800 psi after 7 days, and the composition having a compressive strength of at least 1000 psi after 28 days.

24. The composition of claim 1, comprising:
    between 70% and 95% aggregate by weight of the composition, wherein the aggregate comprises glass;
    between 3% and 5% Portland cement by weight of the composition; and
    between 5% and 20% water by weight of the composition;
    the composition having a compressive strength of at least 20 psi after 7 days, and the composition having a compressive strength of at least 50 psi after 28 days.

25. The composition of claim 24, wherein the composition has a compressive strength of between 50 psi and 300 psi after 28 days.

26. The composition of claim 25, wherein the composition has a compressive strength of between 50 psi and 150 psi after 28 days.

* * * * *